Figure 2:
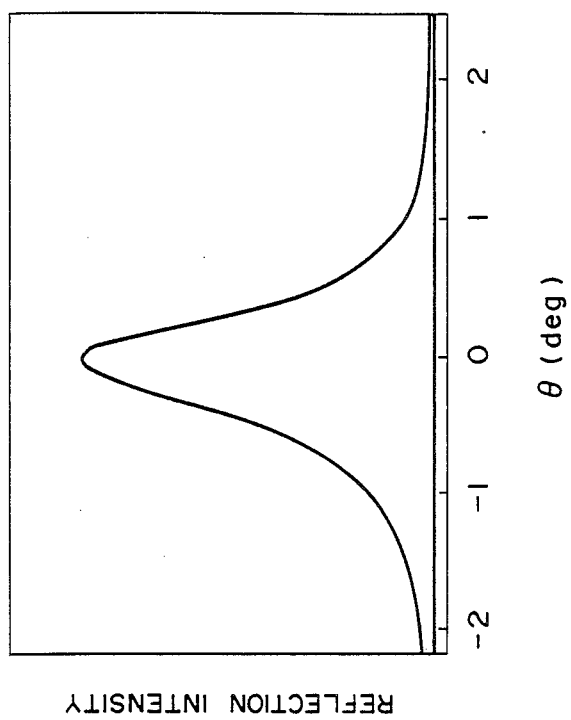

United States Patent [19]

Taguchi et al.

[11] Patent Number: 4,842,665
[45] Date of Patent: Jun. 27, 1989

[54] METHOD OF PRODUCING A GRAPHITE MONOCHROMATOR FOR X-RAYS AND NEUTRONS

[75] Inventors: Satoshi Taguchi, Suita; Wataru Utsumi, Tokyo, both of Japan

[73] Assignee: Sumitomo Chemical Company, Limited, Osaka, Japan

[21] Appl. No.: 92,141

[22] Filed: Sep. 2, 1987

[30] Foreign Application Priority Data

Sep. 9, 1986 [JP] Japan ................... 61-212958
Jun. 16, 1987 [JP] Japan ................... 62-150699

[51] Int. Cl.$^4$ ............................................... G21K 1/06
[52] U.S. Cl. ........................................ 156/155; 378/84
[58] Field of Search ............ 378/84, 85, 82, 83; 156/155; 264/29.5, 29.7; 428/408

[56] References Cited

U.S. PATENT DOCUMENTS

| | | | |
|---|---|---|---|
| 3,424,428 | 1/1969 | Canon | 378/84 X |
| 3,671,385 | 6/1972 | Trent et al. | 156/155 X |
| 3,859,158 | 1/1975 | Park | 156/155 X |
| 4,599,193 | 7/1986 | Murase et al. | |
| 4,626,588 | 12/1986 | Murase et al. | |

FOREIGN PATENT DOCUMENTS 0203581 12/1986 European Pat. Off. .
0205970 12/1986 European Pat. Off. .
0219345 4/1987 European Pat. Off. .

OTHER PUBLICATIONS

Chemistry and Physics of Carbon, pp. 264–275, 1973.
Appl. Phys. Lett., vol. 48, No. 23, Jun. 9, 1986, pp. 1594–1596, American Institute of Physics; M. Murakami et al.

*Primary Examiner*—Michael W. Ball
*Assistant Examiner*—Jeff H. Aftergut
*Attorney, Agent, or Firm*—Stevens, Davis, Miller & Mosher

[57] ABSTRACT

A graphite monochromator for X-rays and neutrons which uses a graphitized product obtained by graphitizing a polymer film in an inert atmosphere at a temperature of 2,000° to 3,500° C., which has an extremely excellent plane orientation, and has an excellent smoothness and a mosaic spread of 4° or less.

6 Claims, 1 Drawing Sheet

METHOD OF PRODUCING A GRAPHITE MONOCHROMATOR FOR X-RAYS AND NEUTRONS

This invention relates to a graphite monochromator for X-rays and neutrons which uses a graphitized product of polymer film.

In recent years, X-rays are very widely used as a means of analysis including, for example, the structural analysis of materials. In such cases, usually characteristic X-rays obtained from copper, iron, molybdenum etc. are used and, to obtain the strongest Kα characteristic rays alone, monochromators which utilize the reflection at the (002) plane of graphite are commonly used. Also, neutrons are actively used for the study of material properties and, they are made monochromatic by the use of graphite monochromators.

In the latter case, graphite monochromators are used, besides to make neutrons monochromatic by passing them through a graphite monochromator before their incidence upon a sample, also to cut off ½ higher harmonics by passing the neutrons reflected by the sample through a graphite monochromator. The latter monochromator is sometimes called an analyzer or a filter.

Hitherto, for graphite monochromators, highly oriented pyrolytic graphite (hereinafter abbreviated as "HOPG") has been used which is obtained by graphitizing pyrolitic carbon at a high temperature and a high pressure of, for example, 3,000° C. and 400 kg/cm².

However, the HOPG mentioned above has disadvantages in that it requires a special apparatus for its production since the production involves steps of preparing pyrolytic carbon by thermal decomposition of hydrocarbon gas and then graphitizing the carbon under severe conditions mentioned above, that only a small portion of the HOPG thus obtained is usable for a monochromator, and that a great difficulty is encountered in preparing a curved monochromator used for focusing X-rays. Accordingly, it is eagerly awaited in the art to obtain a graphite monochromator from a material which can be highly oriented easily and can be worked into a curved form without difficulty.

The object of this invention is to provide a graphite monochromator which can overcome the above-mentioned deflects.

According to this invention, there is provided a graphite monochromator for X-rays and neutrons which uses a graphitized product obtained by pyrolyzing a polymer film in an inert atmosphere at a temperature of 2,000 to 3,500° C.

This invention has been accomplished based on the finding that a graphitized product obtained by pyrolyzing a polymer film in an inert atmosphere under specified conditions can be easily worked into a curved form and can exhibit an excellent property when used for a graphite monochromator for X-rays and neutrons.

The graphite film thus obtained has an extremely excellent plane orientation. Further, when subjected to pretreatment, the film has an excellent smoothness and an excellent characteristic for a monochromator, namely a mosaic spread of 4° or less. Further, the mosaic spread of the graphite monochromator can be controlled by varying the heat treatment conditions.

This invention is now described in detail below.

Figure 1:
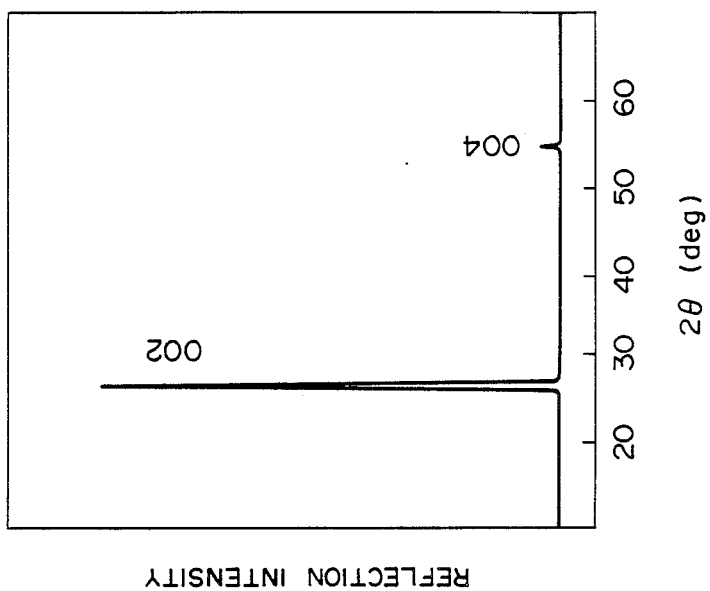

FIGS. 1 and 2 are each a graph showing the X-ray diffraction pattern of a graphite film, the ordinate indicating the reflection intensity (relative intensity) and the abscissa indicating the angle of diffraction.

The polymer film used in this invention is not restricted particularly so long as it can be graphitized while keeping its shape in the pyrolysis. However, it is preferably selected from films of an aromatic polyimide having the repeating unit represented by the general formula (I)

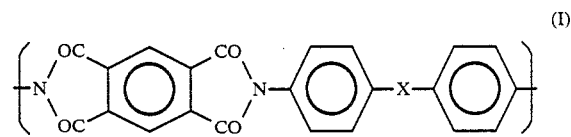

wherein X denotes O CH₂ or SO₂; of an aromatic conjugated polymer having the repeating unit represented by the general formula (II)

wherein R denotes an aromatic hydrocarbon group conjugating with the adjacent vinylene group; of a polymeric sulfonium salt which is one of the precursors of the polymer having the repeating unit represented by the above-mentioned general formula (II) and which has the repeating unit represented by the general formula (III)

wherein R is the same as defined in the formula (II) above and R¹ and R² each denote an alkyl group of 1 to 10 carbon atoms; and Y denotes a counter ion; or the incompletely sulfonium salt-eliminated product (containing sulfur) thereof; and of polyoxadiazole having the repeating unit represented by the general formula (IV)

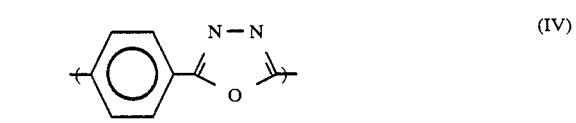

and the like.

As examples of R in the above formulae (II) and (III), there may be given a p-phenylene group and di-substituted p-phenylene groups wherein the 2- and 5-position of the p-phenylene group are substituted with chlorine, an alkyl group of 1 to 6 carbon atoms (e.g. methyl, ethyl, propyl, butyl and hexyl), or an alkoxy group of 1 to 6 carbon atoms (e.g. methoxy, ethoxy, propoxy, and butoxy). In the case of the polymeric sulfonium salt having the repeating unit of the formula (III) and when R is for example the p-phenylene group, the polymer goes via. poly-p-phenylenevinylene in the course of heating. Further, the incompletely sulfonium salt-eliminated product contains a small amount of sulfur since it is an intermediate in the course of attaining poly-p-phenylene-vinylene.

As preferred examples, there may be given films of poly-N,N'-(p,p'-oxydiphenylene)pyromellitic imide represented by the above-mentioned formula (I) wherein X is 0 (oxygen), and of poly-p-phenylenevinylene represented by the above-mentioned formula (II) wherein R is the p-phenylene group.

These polymer films can be prepared by methods described in Japanese Patent publication (Examined) No. 97/62 and Japanese Patent Application Laid-Open No. 199,746/84, etc.

These polymer films are preferably oriented ones which have been subjected to orientation, more preferably plane orientation. Polymer films subjected to substantially biaxial stretching are particularly preferred.

Though the thickness of these polymer films is not restricted especially, it is usually 50 μm or less, more preferably 30 μm or less.

Although these polymer films may be subjected to pyrolysis as they are, it is preferable to subject them to a pre-heating prior to the aforesaid pyrolysis to obtain smooth and substantially wrinkle-free graphite films. The pre-heating of the polymer film is carried out in an inert atmosphere (e.g. nitrogen, argon) or under vacuum at a temperature of 500° to 1,500° C., preferably 700° to 1,500° C. The pre-heating is preferably conducted while the polymer film is being hold between thermally stable plates such as graphite plates or quartz glass plates, more preferably while the film is being closely contacted with the plates of the both sides. When a gap is present between the film and the plate, the film will often develop wrinkles during the preheating.

In the pre-heating, a heating rate above the temperature at which the polymer begins to decompose is preferably 1° C./minute or more, more preferably 5° C./minute or more, up to the pre-heating temperature. The heating rate of not less than 1° C./minute tends to cause bubble formation in the film.

The graphite film obtained after subjected to the said pre-heating and successively to the pyrolysis described below is free from bubbles and wrinkles and highly excellent in smoothness as compared with that obtained by the pyrolysis alone.

The pyrolysis is carried out at a temperature of 2,000° to 3,500° C. When the pyrolyzing temperature is below 2,000° C., graphitization does not proceed substantially; whereas the temperature exceeding 3,500° C. leads to a marked sublimation of carbon and enormous energy consumption. The pyrolyzing time is not limited particularly, but preferably, it should be determined appropriately, taking the pyrolyzing temperature into consideration, so that the graphitization of the film can be attained sufficiently. Although the pyrolysis may be carried out while the film is either in an unrestrained state or under tension, it is preferably conducted while the film is being held between graphite plates. In this case, the clearance between the graphite plates is preferably set at 3 to 100 times, more preferably 5 to 20 times the thickness of the film. When the clearance is too small, the film will be directly pressed against the graphite plate, which prevents the smooth extension of the film during the graphitization; whereas when it is too large, it will cause wrinkles to develop in the resulting film.

The graphite film thus prepared is preferably used in a laminated form in order to increase the reflection intensity of X-rays and neutrons. The thickness of laminate is preferably 200 μm to 10 mm, more preferably 300 μm to 5 mm.

Although the use of a plurality of the graphite film, in mere piles is effective in increasing the reflection intensity, it is more preferable to laminate them by piling up the sheets of the graphite film and then subjecting them again to heating at 700° to 3,500° C. in an inert atmosphere.

To accomplish the lamination smoothly it is preferable, in the heating, to put the laminated sheets of the graphite film between thermally stable plates applying pressure thereto by binding the plates tightly with bolts and the like.

The lamination can also be accomplished by a method which comprises piling up the sheets of pre-heated film and then subjecting them to pyrolysis or one which comprises piling up the sheets of polymer film and then subjecting them to pyrolysis.

Some appropriate adhesive may also be used in the lamination which can be turned into carbon atoms alone by the heating.

Those adhesives which contain an easily graphitizable material are preferable. Examples of such easily graphitizable materials include polyvinyl chloride, pitch and polymeric sulfonium salts represented by the formula (III).

In the laminated products thus obtained by these methods, the sheets of graphite film are in good adhesion to one another and do not peel off to pieces. Accordingly, they can be easily used for monochromators.

For curved monochromators capable of focusing X-rays, the desired product can be easily prepared by putting the film between thermally stable plates having a predetermined curvature and treating it by the above-mentioned methods.

This invention is further described in detail below with reference to Examples.

EXAMPLE 1

Pyromellitic acid and diaminodiphenyl ether were polycondensed by a conventional method and then formed into film. The aromatic polyamide-acid film thus obtained was fixed along its 4 edges and heat-treated at 400° C. to effect plane orientation. Thus, aromatic polyimide film of 13 μm thickness was obtained. The film was put between graphite plates and brought up to 700° C. in a nitrogen gas atmosphere at a heating rate of 10° C./minute to effect pretreatment. After cooled down to room temperature, the film was put between graphite plates provided with a spacer of 0.5 mm thickness and was heated in an argon gas atmosphere from room temperature up to 3,000° C. in the course of 2 hours and then maintained at 3,000° C. for 20 minutes. The graphitized film thus obtained had a thickness of 5 μm, a surface with a metallic luster and an excellent smoothness and was free from bubbles and wrinkles.

The film was fixed onto the sample stage of an X-ray diffractometer and its diffraction pattern was determined by a conventional reflection method using the characteristic X-rays from the copper target. Reflection peaks coming only from the (002) and (004) plane of graphite were observed as shown in FIG. 1, revealing that the film was highly oriented in the plane.

The reflection from the (002) plane showed a very sharp peak, its half value width being 0.11°.

Further, to examine the orientation in the plane more quantitatively, the counter tube of the diffractometer was fixed at $2\theta = 26.5°$ and the sample stage alone was rotated to determine the mosaic spread. A diffraction pattern shown in FIG. 2 was obtained, showing a high degree of orientation, namely a mosaic spread of 0.8°. The X-ray characteristic of the film was extremely excellent, revealing that the film could be satisfactorily used as a monochromator for X-rays and neutrons.

EXAMPLE 2

An aromatic polyamide-acid film obtained in the same manner as in Example 1 was fixed along its 4 edges and heat-treated at 400° C. to effect plane orientation Thus, an aromatic polyimide film of 25 μm thickness was obtained. The film was subjected to preheating and then to pyrolysis in the same manner as in Example 1 to obtain a graphite film of 10 μm thickness. The film had a surface with a metallic luster and an excellent smoothness and was free from bubbles and wrinkles. The X-ray diffraction pattern of the film showed that the film was highly oriented in the plane and the reflection from the (002) plane had a half value width of 0.12°. The mosaic spread was 1.2°.

EXAMPLE 3

The polyimide film obtained in Example 2 was subjected to preheating and then to pyrolysis in the same manner as in Example 1 except that the maximum temperature of the pyrolysis was altered to 2,900° C. The film thus obtained was excellent in smoothness. The X-ray diffraction pattern of the film showed that the film was highly oriented in the plane and the reflection from the (002) plane had a half value width of 0.13°. The mosaic spread was 2.4°.

EXAMPLE 4 p-Phenylene-bis(methylenedimethylsulfonium bromide) and an aqueous sodium hydroxide solution were mixed and allowed to react to give an aqueous solution of polymeric sulfonium salt.

The reaction solution obtained above was dialyzed against water for one day by use of a dialysis membrane (Cellotube ®, cut-off molecular weight: 8,000). The dialyzate was cast and dried under reduced pressure to obtain a polymeric intermediate film. The film was subjected to sulfonium salt elimination at a temperature of 300° C. while being stretched biaxially. Thus, a poly-p-phenylenevinylene film of a stretching ratio of 3 and a thickness of 15 μm was obtained. The film was subjected to preheating and pyrolysis in the same manner as in Example 1 to give a graphite film. The film was smooth and free from bubbles and wrinkles.

The X-ray diffraction pattern of the film showed that the film was highly oriented in the plane and the reflection from the (002) plane had a half value width of 0.11°. The mosaic spread was 1.64°.

EXAMPLE 5

Ten sheets of the graphite film obtained in Example 1 were fixed in piles onto the sample stage to determine their X-ray diffraction. It was confirmed that owing to the effect of lamination, the integrated reflection intensity from the (002) plane of graphite was six-fold or more as compared with that of a single sheet film. In this case, no difference was observed in the mosaic spread between the laminated film and the single sheet film, showing that a high orientation was maintained even after lamination.

EXAMPLE 6

Forty sheets of the graphite film obtained in Example 2 were piled up and put between two graphite plates. Then, the two graphite plates were bound tightly with graphite bolts and nuts. While pressure was thus being applied to the sample, the sample was heated up to 3,000° C. in an argon gas atmosphere taking 2 hours and kept at 3,000° C. for 20 minutes. The resulting sample comprised 40 sheets of the graphite film closely adhered to one another and was excellent also in smoothness.

EXAMPLE 7

An aromatic polyimide film was obtained in the same manner as in Example 2. The film was subjected to pretreatment in the same manner as in Example 2. Forty sheets of the pretreated film was piled up and put between two graphite plates. Then, the two graphite plates were bound tightly with graphite bolts and nuts. While pressure was thus being applied to the sample, the sample was heated up to 3,000° C. in an argon gas atmosphere taking 2 hours and kept at 3,000° C. for 20 minutes. The resulting sample composed of 40 sheets of the graphite film closely adhered to one another and showed no peeling. The sample could be cut with a knife, which confirmed that the adhesion between the sheets was excellent.

EXAMPLE 8

One hundred sheets of the graphite film obtained in Example 2 were adhered to one another by using as an adhesive an aqueous solution of the polymeric sulfonium salt represented by the formula (III) and then pressed at 150° C. and at 500 kg/cm² to effect lamination. The laminated product was put between graphite plates, then brought up to 850° C. in a nitrogen atmosphere and kept at 850° C. for one hour to remove off other elements than carbon in the polymeric sulfonium salt. The sample obtained after cooling showed that the sheets of graphite film therein were in close adhesion to one another. Determination of the orientation showed that its mosaic spread was 1.9°.

What is claimed is:

1. A process for producing a graphite monochromator for X-rays or neutrons having a mosaic spread of 4° or less, which comprises
pyrolyzing a plurality of sheets of film of a polymer selected from the group consisting of aromatic polyimides having the repeating unit represented by the formula (I):

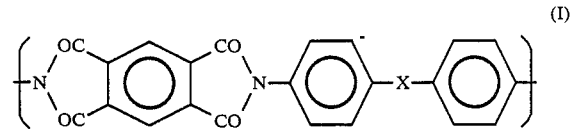

wherein X denotes O, CH₂ or SO₂;
polyphenylene-vinylenes having the repeating unit represented by the formula (II):

wherein R denotes an aromatic hydrocarbon group conjugating with the adjacent vinylene group:
polymeric sulfonium salts represented by the formula (III):

wherein R denotes the same as defined in the formula (II) above, R¹ and R² each denote an alkyl group of 1 to 10 carbon atoms and Y denotes a counter ion; and polyoxadiazoles having the repeating unit represented by the general formula (IV):

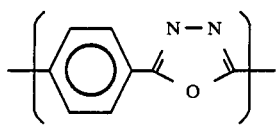
(IV)

in an inert atmosphere at a temperature of 2,000° C. to 3,500° C. to form a graphitized film and laminating the sheets of the resulting graphitized film to one another or laminating a plurality of sheets of the polymer film to one another prior to the pyrolysis.

2. The process according to claim 1, wherein the lamination of the graphite films is carried out by adhering a plurality of the graphite film with an adhesive containing a graphitizable material and then heating the laminate at 700° to 3,500° C.

3. The process according to claim 2, wherein the graphitizable material is selected from the group consisting of polyvinyl chloride, a pitch and a polymeric sulfonium salt represented by the formula (III);

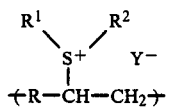
(III)

wherein R denotes an aromatic hydrocarbon group conjugating with the adjacent vinylene group formed by elimination of the sulfonium salt, R¹ and R² each denote an alkyl group of 1 to 10 carbon atoms and Y denotes a counter ion.

4. The process according to claim 1, wherein a pre-heating of the polymer film is carried out in an inert atmosphere at a temperature of 500° C. to 1,500° C., a plurality of sheets of the pre-heated film are laminated prior to the pyrolysis, and the heating rate above the temperature at which the polymer begins to decompose and up to the pre-heating temperature is 1° C./minute or more.

5. A process for producing a graphite monochromator for X-rays or neutrons having a mosaic spread of 4° or less, which comprises
pre-heating a film of polymer selected from the group consisting of aromatic polyimides having the repeating unit represented by the formula (I):

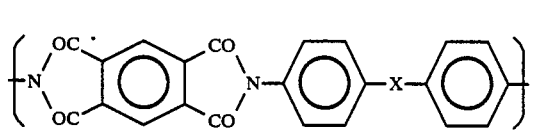
(I)

wherein X denotes O, CH₂ or SO₂,
polyphenylene-vinylenes having the repeating unit represented by the formula (II):

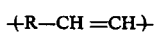
+R—CH =CH+   (II)

wherein R denotes an aromatic hydrocarbon group conjugating with the adjacent vinylene group,
polymeric sulfonium salts represented by the formula (III):

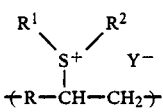
(III)

wherein R denotes the same as defined in the formula (II) above, R¹ and R² each denote an alkyl group of 1 to 10 carbon atoms and Y denotes a counter ion, and polyoxadiazole having the repeating unit represented by the general formula (IV):

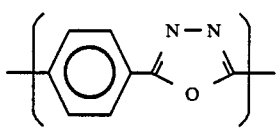
(IV)

in an inert atmosphere at a temperature of 500° C. to 1,500° C. while holding the film between two thermally stable plates, and pyrolyzing the pre-heated film in an inert atmosphere at a temperature of 2,000° C. to 3,500° C. while holding the film between two thermally stable plates having a clearance of 3 to 100 times the thickness of the film to form a graphite film and laminating a plurality of sheets of the resulting graphite film to one another.

6. A process for producing a graphite monochromator for X-rays or neutrons having a mosaic spread of 4° or less, which comprises
pre-heating a film of polymer selected from the group consisting of aromatic polyimides having the repeating unit represented by the formula (I):

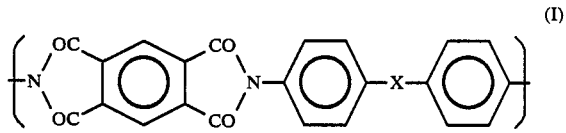
(I)

wherein X denotes O, CH² or SO₂,
polyphenylene-vinylenes having the repeating unit represented by the formula (II):

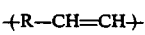
+R—CH=CH+   (II)

wherein R denotes an aromatic hydrocarbon group conjugating with the adjacent vinylene group,
polymeric sulfonium salts represented by the formula (III):

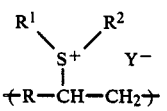
(III)

wherein R denotes the same as defined in the formula (II) above, R¹ and R² each denote an alkyl group of 1 to 10 carbon atoms and Y denotes a counter ion, and polyoxadiazole having the repeating unit represented by the general formula (IV):

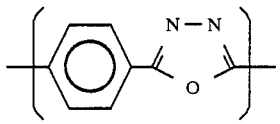

in an inert atmosphere at a temperature of 500° C. to 1,500° C. while holding the film between two thermally stable plates, and pyrolyzing a plurality of sheets of the pre-heated film put between two thermally stable plates in an inert atmosphere at a temperature of 2,000° C. to 3,000° C. thereby to obtain a laminated graphite product.

* * * * *